United States Patent
Crutcher

(10) Patent No.: US 7,125,060 B2
(45) Date of Patent: Oct. 24, 2006

(54) HANDLE AND HANDLE SET FOR COLLECTING AND TRANSPORTING A LOAD IN A TARPAULIN

(76) Inventor: William C. Crutcher, 84 Munson Rd., Middlebury, CT (US) 06762

( * ) Notice: Subject to any disclaimer, the term of this patent is extended or adjusted under 35 U.S.C. 154(b) by 79 days.

(21) Appl. No.: 10/904,970

(22) Filed: Dec. 7, 2004

(65) Prior Publication Data

US 2006/0119122 A1    Jun. 8, 2006

(51) Int. Cl.
*A45F 5/10*    (2006.01)
*E04H 15/62*    (2006.01)

(52) U.S. Cl. .................. 294/142; 294/170; 135/118
(58) Field of Classification Search ............... 294/141, 294/142, 137, 159, 170, 61; 5/417; 135/118; 52/4
See application file for complete search history.

(56) References Cited

U.S. PATENT DOCUMENTS

| | | | |
|---|---|---|---|
| 352,736 A | * 11/1886 | Coles | ............ 294/61 |
| RE22,753 E | * 5/1946 | Trevisan | ............ 294/150 |
| 2,974,971 A | 3/1961 | Buck | ............ 280/19 |
| 3,215,181 A | * 11/1965 | Reed | ............ 211/70.2 |
| 3,799,416 A | * 3/1974 | Schmaltz | ............ 294/142 |
| 4,580,372 A | 4/1986 | Osborn | ............ 52/3 |
| 4,825,600 A | * 5/1989 | Osgood, Sr. | ............ 52/4 |
| 5,048,240 A | * 9/1991 | Dupre et al. | ............ 52/4 |
| 5,509,708 A | * 4/1996 | Nathan | ............ 294/141 |
| 5,564,232 A | 10/1996 | Callaway | ............ 5/4 |
| 5,943,831 A | 8/1999 | Pangburn | ............ 52/155 |
| 6,565,101 B1 | 5/2003 | Jones, Jr. | ............ 280/19 |

* cited by examiner

*Primary Examiner*—Dean J. Kramer

(57) ABSTRACT

Four identical handles for manipulating a tarpaulin with grommets in the four corners to collect and transport a load. Each handle has a handgrip with a hook on each end, a staking member, and an attachment system to hold a grommeted corner of the tarpaulin. The hooks are dimensioned to admit and support the handgrips of other handles. Two handles are grasped together by a user and the handgrips of the other two handles are hung on opposite pairs of hooks of the grasped handles that the load in the tarpaulin may be gathered and transported by the grasped handgrips.

16 Claims, 7 Drawing Sheets

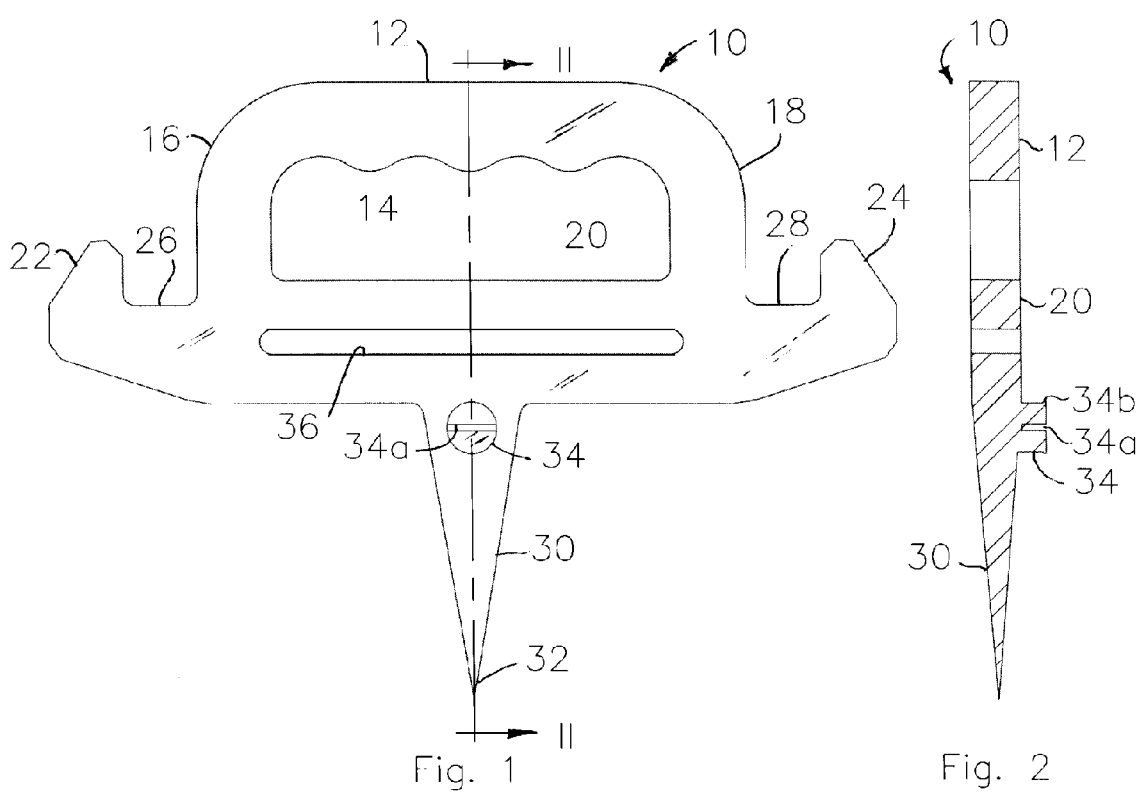

HANDLE AND HANDLE SET FOR COLLECTING AND TRANSPORTING A LOAD IN A TARPAULIN

BACKGROUND OF THE INVENTION

This invention relates to a lawn and garden accessory for clearing leaves, grass clippings and other types of refuse, which can be raked into a pile for removal from a lawn or field. Raking leaves in the autumn and removing them is a common problem. Grass clippings from a lawn mower should also be removed along with other types of light refuse, such as small limbs or dead vegetable matter.

One method for removing such material is to rake it into piles and load the piles into a conveyance. When the material is light and bulky, particularly leaves, the conveyance fills quickly, but with very little weight, and requires many trips. Another method for removing such material is to rake it onto a plastic or cloth tarpaulin or other type of pliant sheet member, gather the corners and manually carry or drag the load to a disposal area.

When the tarpaulin is spread out, it will often not stay in place, due to the wind blowing it or due to the raking action or the blast from a leaf blower. Gathering and holding the corners of the tarpaulin is tiring on the hands of the user when the load is carried or dragged for some distance.

Suggestions have been made in the prior art for addressing various aspects of these problems.

A pickup device for hauling leaves in a pliant sheet member is shown in U.S. Pat. No. 2,974,971 issued Mar. 14, 1961 to Buck. The device is provided with hold down stakes and a handle for dragging, but must be especially constructed for the task.

Exemplary of a device to convert a conventional general-purpose tarpaulin for dragging refuse is seen in U.S. Pat. No. 6,565,101 issued May 20, 2003 to James, Jr. A mandrel holds the tarpaulin flat on one end while raking and shapes the tarpaulin for dragging the refuse. The tarpaulin must be equipped with a hauling rope running through grommets.

A tarpaulin hold down device is shown in U.S. Pat. No. 5,564,232 issued Oct. 15, 1996 to Callaway. Stakes with integral handles are attached and retained by conventional grommets on the tarpaulin and used to stake the corners in place. The only purpose for the handles is to push the stakes into the ground.

Another tarpaulin hold down device is shown in U.S. Pat. No. 4,580,372 issued Apr. 8, 1986 to Osborn. weighted handles are attached to the tarpaulin corners by threaded necks and closures for lifting the tarpaulin. This requires special large grommets and adds to the overall weight of the load, as well as requiring the user to manipulate four handgrips at once.

Lastly, a device for gathering and hooking together the four corners of a tarpaulin is shown in U.S. Pat. No. 5,943,831 issued Aug. 31, 1999 to Pangburn. A single bent rod of elastically deformable material is attached by threading the end through all four corners. It would appear to be time-consuming to attach and detach the device, and there is no hand grip by which to hold it.

It would be desirable to have a set of handles which could perform the functions of holding the tarpaulin in place, collecting the load by gathering the corners of the tarpaulin, and serving to carry or drag the gathered load manually with one hand.

Accordingly, one object of the present invention is to provide an improved handle for collecting and transporting a load in a tarpaulin or similar pliant sheet member.

Another object of the invention is to provide an improved handle for holding a tarpaulin in place while collecting a load of light bulky material on the pliant sheet member.

Still another object of the invention is to provide a handle with improved means for attachment to the corner of a tarpaulin.

Still another object of the invention is to provide an improved handle which, together with other substantially identical handles in a set, cooperate for collecting and carrying or dragging a load in a tarpaulin.

SUMMARY OF THE INVENTION

Briefly stated the invention comprises a handle for making up a set of such handles used to manipulate a tarpaulin to collect and transport a load, the tarpaulin having corners, each of the handles comprising a longitudinal handgrip having opposite ends, a pair of hooks each disposed near a respective opposite end of the handgrip, attachment means adapted to connect the handle to one of the corners of the tarpaulin, and a staking member extending from the attachment means and adapted for insertion into the ground to hold down a corner of the tarpaulin while collecting a load by raking or blowing it onto the tarpaulin, the handles in the set being constructed and dimensioned such that the handgrips of two of the handles may be grasped together at the same time by a user and such that the hooks of the two grasped handles will admit the handgrips of two other opposed handles, whereby the load in the tarpaulin may be gathered and transported by the handgrips of two grasped handles with the other two handles being supported on the hooks of the grasped handles.

Preferably the handles are in sets of substantially identical handles. They may be of composite construction with a wire metal staking member and molded plastic handgrip, but are preferably constructed as a one-piece plastic molding. Alternatively, they may be formed from a bent metal rod having a handgrip threaded on the rod, or from a metal stamping with a molded plastic handgrip.

The staking member may be integral with the attachment means. The attachment means is preferably designed to cooperate with a metal grommet of the type commonly provided in each corner of commercially available tarpaulins. A preferred attachment means comprises a slot in the handle receiving a grommeted corner of the tarpaulin and a pin projecting from a tapered stake receiving the grommet with a snap fit.

BRIEF DESCRIPTION OF DRAWINGS

The invention will be better understood by reference to the following drawings, in which:

FIG. 1 is a front elevational view of my improved handle for collecting and carrying a load constructed as a plastic molding, FIG. 2 is a cross section of the handle, taken along lines II—II of FIG. 1.

DETAILED DESCRIPTION

Figure 3:
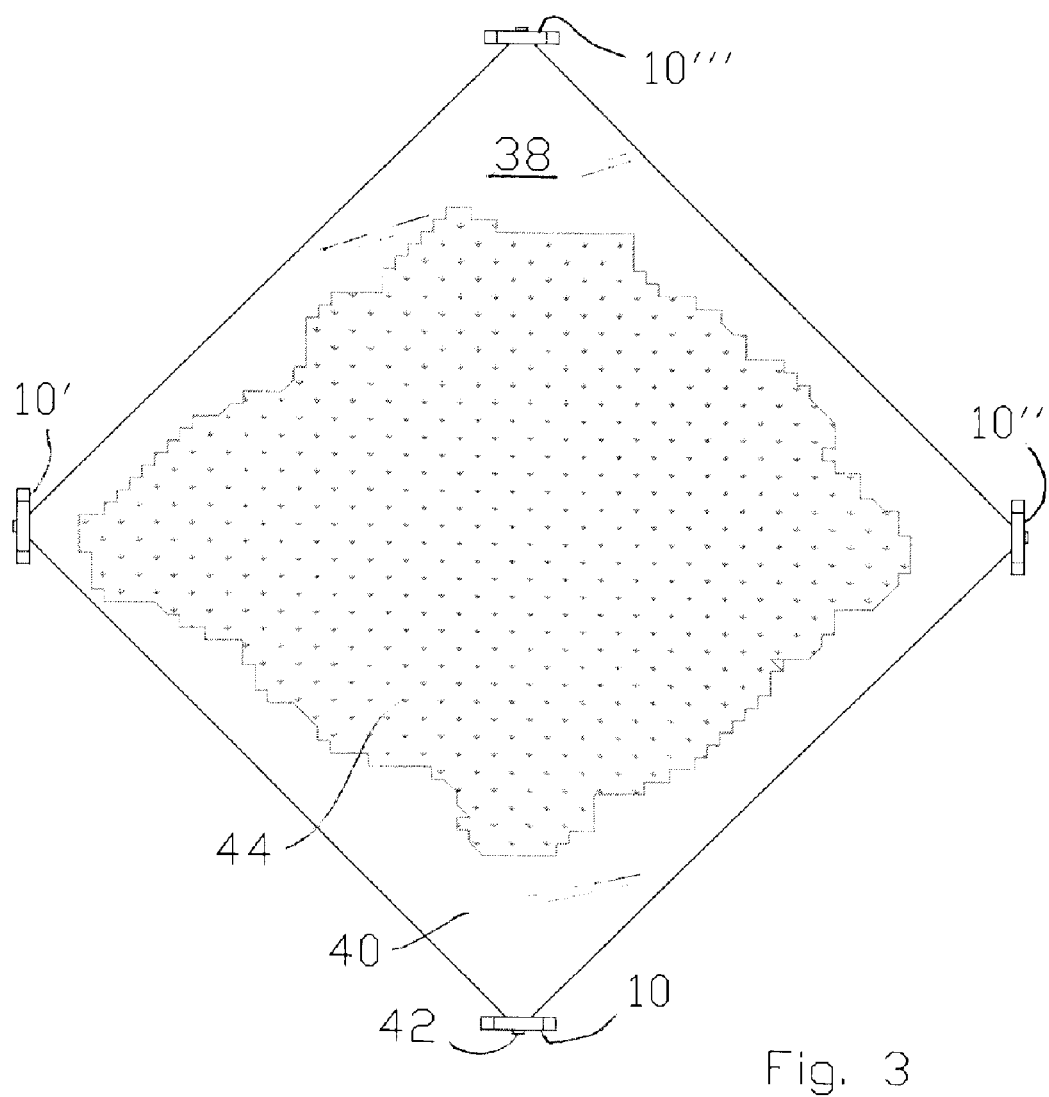
FIG. 3 is a top plan view of a tarpaulin with a load of material and held in place by a set of handles.

Referring to FIGS. 1 and 2 of the drawings, the handle, shown generally at 10 is preferably constructed as a single injection molding of plastic material which is strong, tough and relatively rigid, such as polyurethane, polyethylene, or any one of a number of generic or proprietary plastic materials meeting these characteristics. A handgrip 12 is molded to include undulations 14 to accommodate the fingers of a user of the device. The handgrip 12, as seen in FIG. 2, is thin enough to allow two such handgrips to be grasped in one hand.

Handgrip 12 is connected by integral support legs 16, 18 on its opposite ends to a central body portion 20. Body potion 20 extends in both directions beyond legs 16, 18 to form a pair of hooks 22, 24 disposed at opposite ends of the handgrip 12. The hooks 22, 24 are spaced from legs 16, 18 respectively to provide support surfaces 26, 28 respectively.

Support surfaces 26, 28 are so arranged and dimensioned that they will be able to receive and hook onto handgrips from another handle that is substantially identical to the depicted handle 10. The handgrip 12, together with undulations 14, is so arranged and dimensioned that it will pass between the space between the hook ends and the support legs of a handle that is substantially identical to the depicted handle 10.

Extending downwardly from body portion 20 is a staking member 30 that is tapered as shown, terminating in a point 32. Staking member 30 is of sufficient length and strength to permit the staking member to be pushed into the ground using the handgrip 12 and is of sufficient width at the upper end to retain its position against lateral forces during usage to be described.

Protruding laterally from staking member 30 is an integral pin 34. The pin 34 has an outer diameter over the major part of its length that is small enough to receive a grommet of the type used in commercially available tarpaulins. While the sizes of such grommets may vary, I have found that a pin of 7/16" diameter is suitable. The pin may also be tapered slightly to accommodate the molding process.

In order to retain a tarpaulin grommet in place, the pin 34 is bifurcated as shown at 34a and has slight bulges on the end at 34b that are larger in diameter than the hole in a grommet of a pre-selected size. Thus, a grommet may be forced over the end of pin 34 as the bifurcated pin portions flex slightly and retained with a snap fit.

Lastly, the central portion has a slot 36 extending along its length below and substantially parallel to hand grip 12 and centered above the pin 34. Slot 36 has a width sufficient to allow a grommet of pre-selected thickness to pass through along with a corner portion of a tarpaulin or similar pliant sheet member to which the grommet is attached. The length of the slot 30 is such that it will accommodate the corner of the aforesaid tarpaulin without bunching when the grommet is snapped over pin 34. I have found that a suitable slot is about ¼" wide and between 3½" to 4" long, depending on the distance between pin 34 and slot 36. Pin 34 and slot 36 together provide an attachment means for the corner of a commercially available tarpaulin fitted with a grommet.

Figure 4:
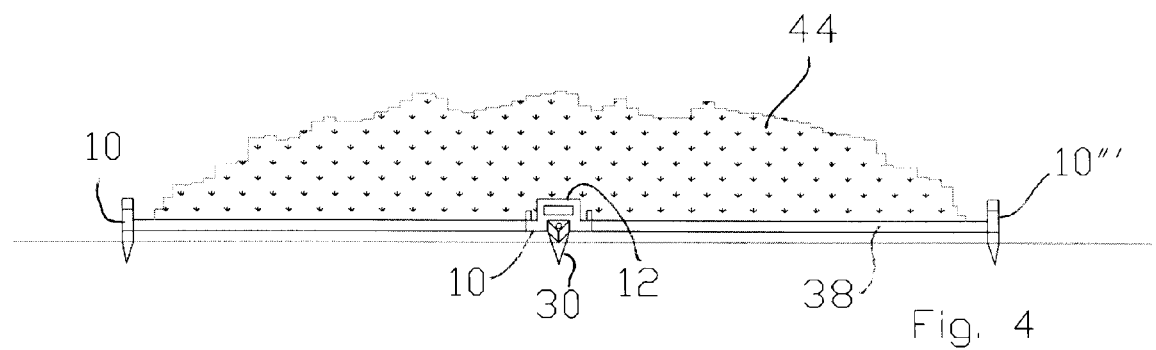
FIG. 4 is a side elevation view of FIG. 3.

FIGS. 3 and 4 show a tarpaulin 38 lying on the ground. Preferably the tarpaulin 38 is square and may vary in dimension from 3 to 8 feet or more, but commercially available tarpaulins of varying rectangular shapes are also suitable. These may be of canvas, fiberglass-reinforced plastic or any type of pliant sheet material that is capable of transporting a load of refuse. Each of the corners, one of which is seen at 40, is fitted with a grommet 42 that has been attached to a handle 10 as previously described. Other substantially identical handles 10', 10" and 10''' have been similarly attached. The four corners are staked to the ground with staking members 30 by means of hand grips 12 to hold the tarpaulin in place against wind and the forces of a rake or leaf blower. A mound of refuse 44, such as leaves or sticks is raked onto the tarpaulin.

Figure 5:
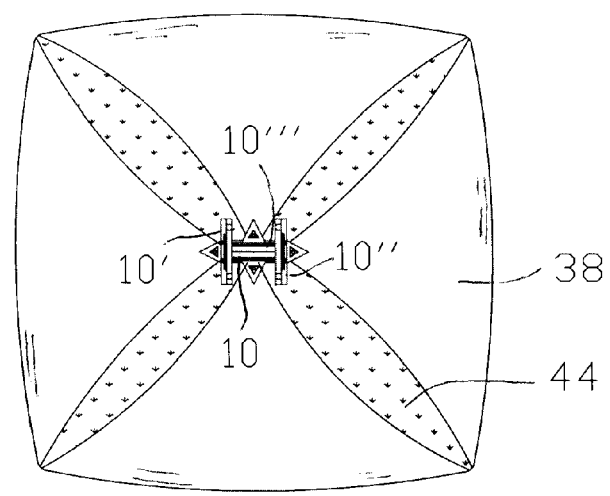
FIG. 5 is a top plan view of the tarpaulin with load collected for carrying.

FIG. 5 shows the tarpaulin with the four corners gathered. First, diagonally opposite corners are pulled together. The handgrips of handles 10 and 10''' are adjacent and may be gripped in one hand. Then the other two corners are separately pulled up and hooked on the grasped handles. The handgrips of handles 10' and 10" are supported by the hooks on opposite ends of handles 10 and 10''' as will be described. The refuse 44 is collected in this manner and the tarpaulin carried or dragged by one hand to where it is dumped by unhooking the handles 10' and 10" and releasing the grasped handles 10 and 10'''.

Figure 6:
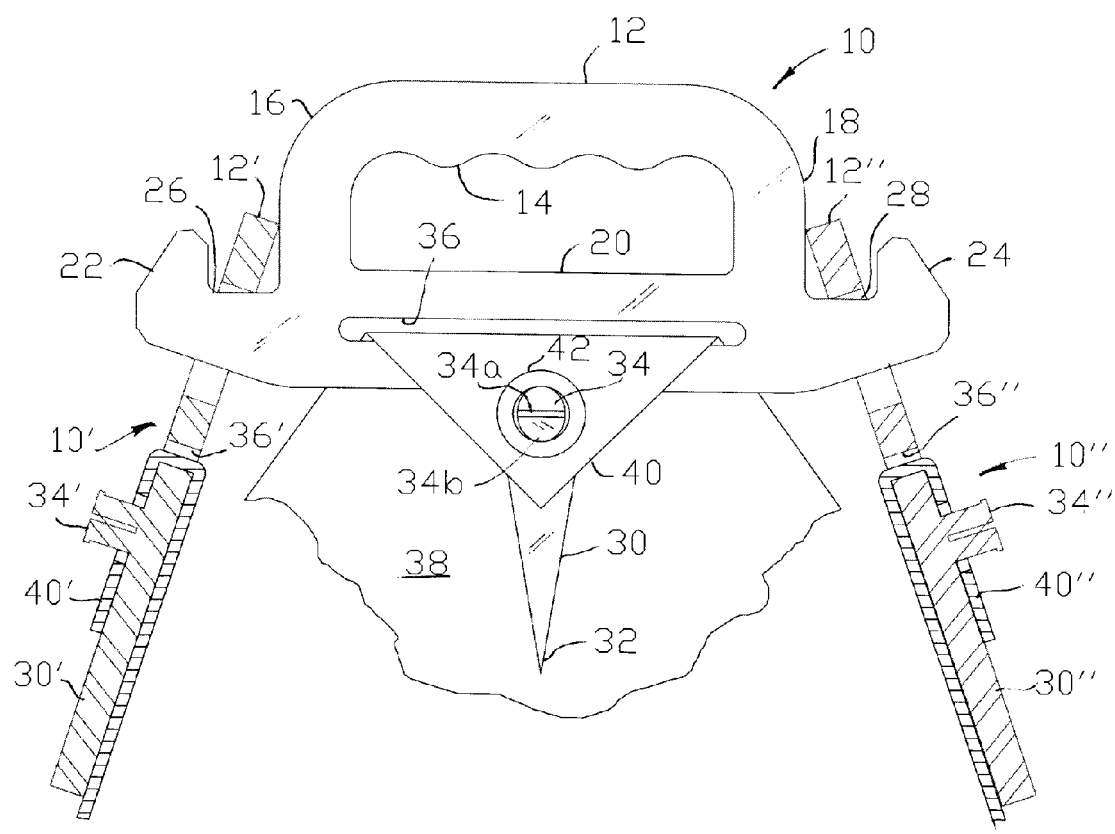
FIG. 6 is a front elevation view of the FIG. 1 handle cooperating with other handles in the set, shown in cross section, and corner portions of a tarpaulin.

Referring now to FIG. 6 of the drawing, the handle 10 is shown, together with cross-sections through the two substantially identical handles 10' and 10". The parts of handles 10' and 10" are identified by the same reference numbers as handle 10 with prime and double prime superscripts. A portion of a pliant sheet member, comprising a commercially available tarpaulin 38 with grommets in its four corners, is shown with one of the corners 40 inserted through slot 36. Corner 40 is fitted with a grommet 42 that has been snapped over the end of pin 34 and retained thereon by the bulging portions 34b. Similarly, another corner 40' of the same tarpaulin 38 has been inserted through slot 36' and snapped over pin 34'. Similarly, another corner 40" of the same tarpaulin 38 has been inserted through slot 36" and snapped over pin 34". A fourth substantially identical handle 10''' and tarpaulin corner (not shown) are located directly behind handle 10. Handle 10 and the fourth handle 10''' are grasped by their respective handgrips as a pair. The handgrips 12' and 12" of handles 10' and 10" respectively are supported by the hooks of the grasped handles 10 and 10''' when a load is being collected and transported by carrying or dragging.

First Modification

Figure 7:
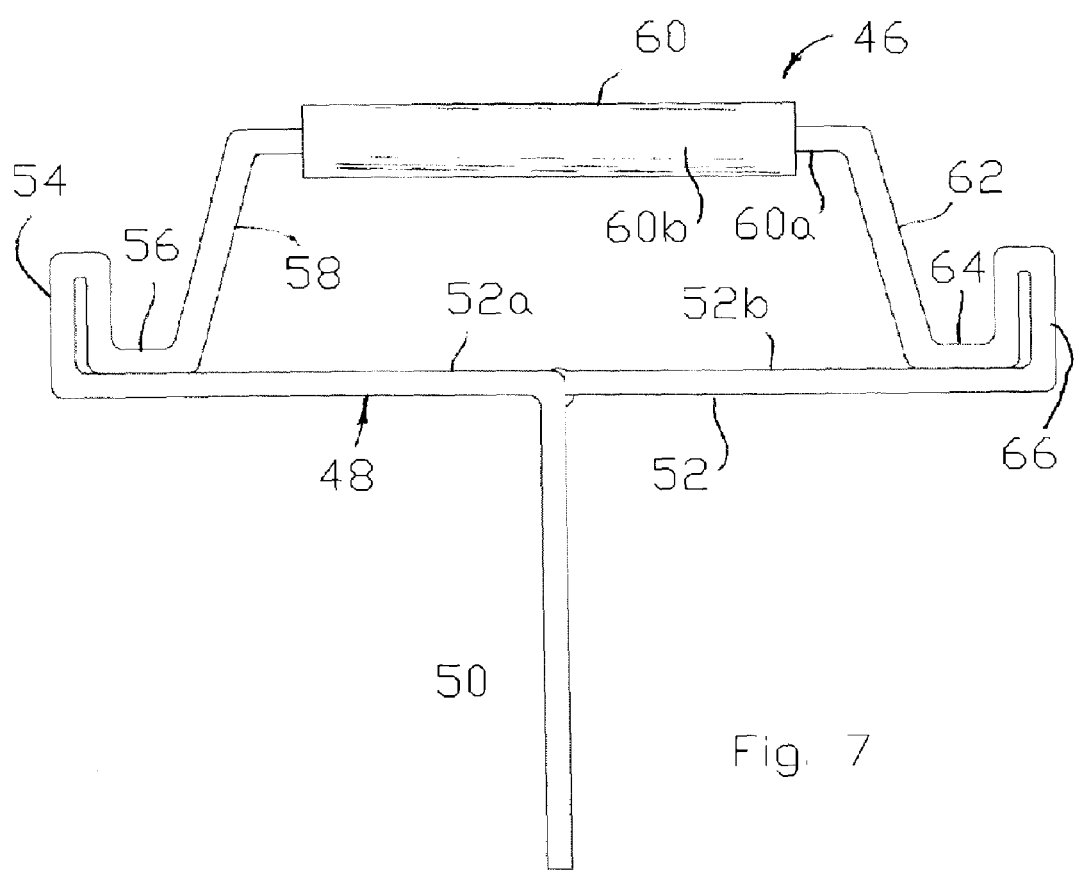
FIG. 7 is a front elevation view of a first modification of the improved handle, constructed from metal rod.
Figure 8:
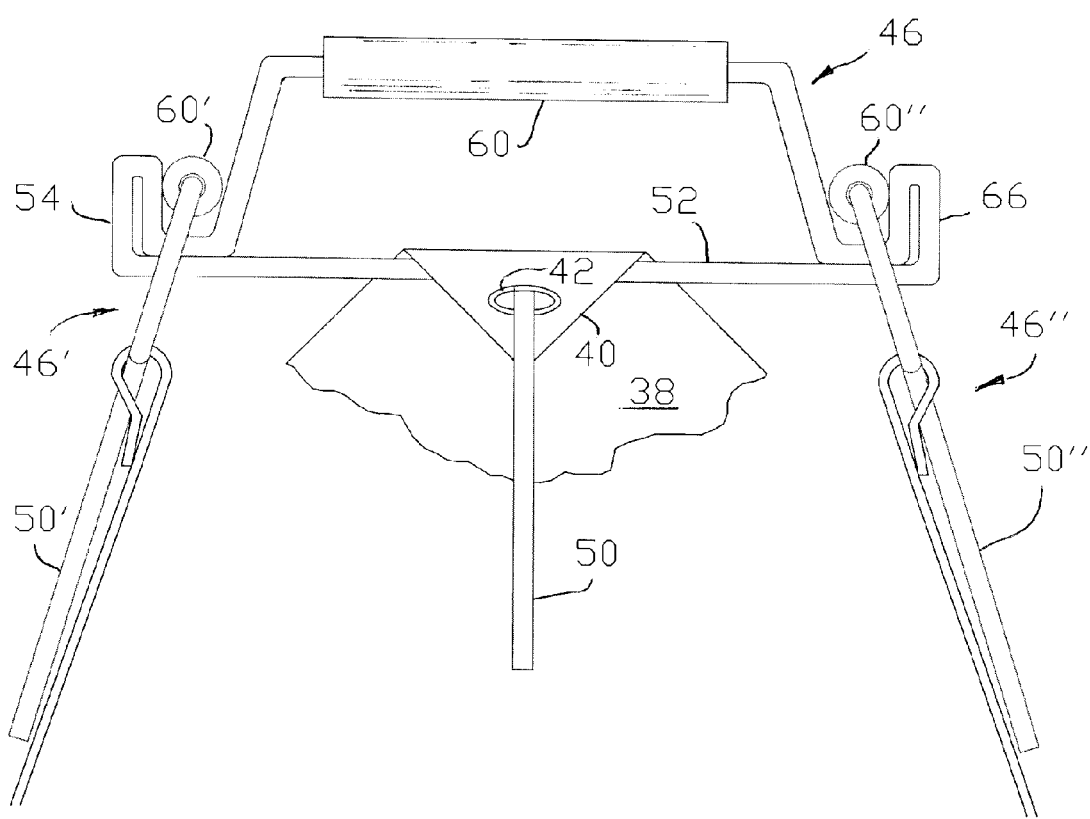
FIG. 8 is the same front elevation view of the FIG. 7 handle cooperating with other handles in the set and portions of a tarpaulin.

FIGS. 7 and 8 illustrate a modified form of the invention as constructed from a metal rod bent into a shape to perform the functions previously described. A handle 46 is formed from a metal rod 48 of steel or similar metal possessing sufficient ductility and strength. Rod 48 is bent as depicted, to successively provide a vertical staking member 50, a perpendicular horizontal central half-section 52a, a vertical doubled-back section making a hook 54, a horizontal handgrip support section 56, a support leg 58, a horizontal hand grip section 60a, a support leg 62, a horizontal hand grip section 64, a vertical doubled-back section making a hook 66 and a horizontal central half-section 52b. The end of central half-section 52b is welded to the end of central half-section 52a to make a complete central section 52. A comfortable hand grip 60 is provided by coating rod section 60a with a plastic over-molding 60b. The over-molding 60b should be small enough to fit on the support surfaces 56, 64 between hooks 54, 66 and support legs 58, 62 respectively of substantially identical handles 46.

FIG. 8 shows an elevation view of a handle 46, along with a fourth handle grasped together behind it (not shown). The tarpaulin 38 has been attached by passing the corner 40 of the tarpaulin through the space between central section 52 and hand grip 60, bringing the grommet 42 down around the end of the staking member 50, and then pulling it tight as shown. The other four corners of the tarpaulin are similarly attached to their respective handles.

Handle 46 is shown, as it would appear after collecting a load of refuse and gathering the four corners of the tarpaulin as previously described in FIGS. 3–5. Handle 46 is shown supporting a substantially identical handle 46' on the left and another handle 46" on the right. Handles 46' and 46" are supported by means of the hooks 54, 66 on opposite ends of hand grip 60 holding hand grips 60', 60" respectively.

Second Modification

Figures 9, 10:
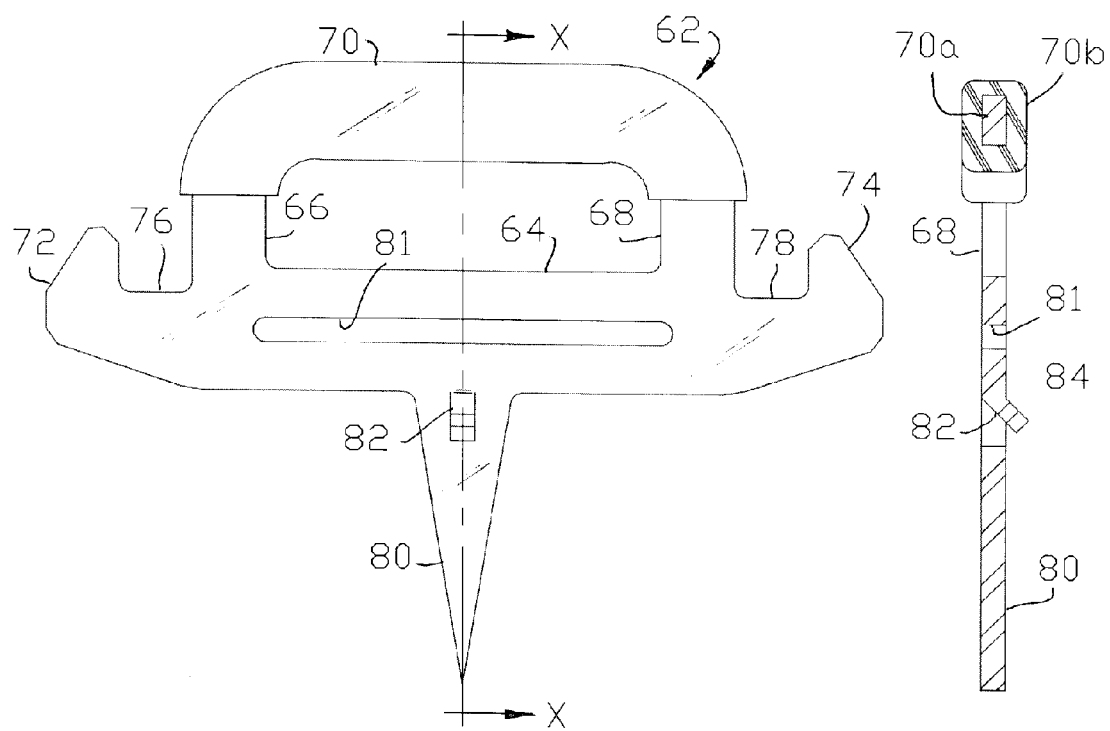
FIG. 9 is a front elevation view of a second modification of the improved handle, constructed from a metal stamping.
FIG. 10 is a cross section of the FIG. 9 handle, taken along lines X—X of FIG. 9.

FIGS. 9 and 10 depict another modification, in which substantially identical handles are constructed from metal stampings. A handle 62 is stamped from a sheet of metal, such as steel. Multiple handles may be stamped from a roll using a series of dies in a transfer press in a well-known conventional in-line process. The dies remove metal to leave functional elements similar to those previously described in connection with the plastic molding shown in FIGS. 1 and 2.

These are a central body portion 64 with support legs 66, 68, joined at the top by a hand grip section 70a. A pair of hooks 72, 74 are spaced from support legs 66, 68 respectively to provide support surfaces 76, 78 respectively.

A tapered staking member 80 extends downwardly from central body portion 64, and a slot 82 is cut in the central body portion to receive the corner of a tarpaulin. A tab 82 is stamped by one of the dies and bent up to leave a projecting end 84 to provide an attachment means. Tab 82 is small enough in width to go through a standard grommet and long enough to hold a grommet wedged in place between staking member 80 and the tab.

Lastly, in another conventional industrial process, the hand grip section 70a is over-molded with a plastic coating 70b to provide a comfortable hand grip 70. A set of four handles substantially identical to the handle 62 are used as previously described in connection with FIG. 6.

Operation

Referring back to FIGS. 3, 4 and 5, the handles of the preferred embodiment and the two modifications are all used the same way. FIGS. 3 and 4 show the tarpaulin 38 lying on the ground. Each of the corners is fitted with a grommet that has been previously attached to substantially identical handles. The four corners are staked to the ground with the staking members to hold the tarpaulin in place against wind and the forces of a rake or leaf blower. A mound of refuse 44, such as leaves or sticks is raked onto the tarpaulin.

FIG. 5 shows the tarpaulin with the four corners gathered. First, diagonally opposite corners are pulled together. The handgrips of the handles may be grasped in one hand. Then the other two corners are separately pulled up by the attached handles and their hand grips are hooked on the hooks of the grasped handles. The refuse 44 is collected in this manner and the tarpaulin carried or dragged to where it is dumped by unhooking the supported handles and then releasing the grasped handles. The handles remain attached to the tarpaulin, which is spread and staked in a new location to repeat the process. When the tarpaulin becomes worn or torn, it may be replaced by a new tarpaulin using the same set of handles and the simple attachment means described.

While there is shown what is considered to be the preferred embodiment and two modifications of the invention, other modifications will become apparent to those skilled in the art. It is desired to secure in the appended claims all such modifications as fall within the true spirit and scope of the invention.

What is claimed is:

1. A handle for manipulating a tarpaulin together with a plurality of other ones of said handles to collect and transport a load, said tarpaulin having a plurality of corners, said handle comprising:
   a longitudinal handgrip having opposite ends,
   a pair of hook means, each hook means of said pair disposed near and extending longitudinally outwardly from a respective opposite end of said handgrip,
   attachment means adapted to connect said handle to one of said corners of the tarpaulin, and
   a staking member extending from said attachment means and adapted for insertion into the ground to hold down a corner of the tarpaulin while collecting a load thereon,
   said handle being constructed and dimensioned to be grasped by a user and such that a hook means of said handle will admit a handgrip so as to support another one of said plurality of other ones of said handles, whereby the load in the tarpaulin may be gathered and transported by a grasped handgrip.

2. A handle according to claim 1, wherein said handle is molded as an integral plastic member.

3. A handle according to claim 1, wherein said hook means, said attachment means and said staking member comprise at least one metal rod member, and wherein said handgrip defines a longitudinal passage, said metal rod member having a portion extending into said longitudinal passage.

4. A handle according to claim 1, wherein said hook means, said attachment means and said staking member comprise a metal stamping and wherein said handgrip comprises a plastic molding encasing a portion of said metal stamping.

5. A handle according to claim 1, wherein said staking member and said attachment means are constructed as an integral member.

6. A handle according to claim 1, wherein said handgrip defines at least one undulation between said opposite ends for resisting longitudinal movement of said handgrip when admitted by a said hook means.

7. A set of four substantially identical handles for manipulating a tarpaulin to collect and transport a load, said tarpaulin having at least four corners each having a grommet therein, each of said handles comprising:
   a longitudinal handgrip having opposite ends,
   a pair of hook means, each hook means of said pair disposed near a respective opposite end of said handgrip,
   attachment means adapted to connect one handle of said set of handles to one of said corners of the tarpaulin, and
   a staking member extending from said handle and adapted for insertion into the ground to hold down a corner of the tarpaulin while collecting a load thereon,
   each handle of said set being constructed and dimensioned such that the handgrips of two of said handles may be grasped together by a user and such that a hook means on either end of the handgrips of said two grasped handles will admit a handgrip of another of said handles, whereby the load in the tarpaulin may be gathered and transported by said grasped handgrips.

8. The set of handles according to claim 7, wherein each said handle is molded as an integral plastic member.

9. The set of handles according to claim 7, wherein said hook means, said attachment means and said staking member comprise at least one metal rod member, and wherein said handgrip defines a longitudinal passage, said metal rod member having a portion extending into said longitudinal passage.

10. The set of handles according to claim 7, wherein said hook means, said attachment means and said staking member comprise a metal stamping and wherein said handgrip comprises a plastic molding encasing a portion of said metal stamping.

11. The set of handles according to claim 7, wherein each of said handgrips define at least one undulation between said opposite ends for preventing longitudinal movement of said handgrip when admitted by a said hook means.

12. The set of handles according to claim 7, wherein said staking member and said attachment means are constructed as an integral member.

13. The set of handles according to claim 12, wherein said attachment means comprises a slot in the handle and a pin projecting laterally from said staking member.

14. The set of handles according to claim 13, wherein said slot is dimensioned to receive a corner of said tarpaulin therethrough.

15. The set of handles according to claim 13, wherein said pin is adapted to receive a said grommet in a corner of said tarpaulin with a snap fit.

16. The set of handles according to claim 12, wherein said attachment means and said staking member comprise a metal rod means depending from the handle and adapted to receive a said grommet in a corner of said tarpaulin.

* * * * *